US010614148B2

(12) United States Patent
Balasubramaniyan et al.

(10) Patent No.: US 10,614,148 B2
(45) Date of Patent: Apr. 7, 2020

(54) RECONFIGURABLE CONVOLUTION ACCELERATOR

(71) Applicant: HCL TECHNOLOGIES LIMITED, Noida, Uttar Pradesh (IN)

(72) Inventors: Prasanna Venkatesh Balasubramaniyan, Tamil Nadu (IN); Sainarayanan Gopalakrishnan, Tamil Nadu (IN); Gunamani Rajagopal, Tamil Nadu (IN)

(73) Assignee: HCL TECHNOLOGIES LIMITED (IN)

( * ) Notice: Subject to any disclaimer, the term of this patent is extended or adjusted under 35 U.S.C. 154(b) by 65 days.

(21) Appl. No.: 16/135,947

(22) Filed: Sep. 19, 2018

(65) Prior Publication Data
US 2019/0392020 A1 Dec. 26, 2019

(30) Foreign Application Priority Data
Jun. 26, 2018 (IN) .............................. 201811023855

(51) Int. Cl.
*G06F 17/17* (2006.01)
*G06F 17/15* (2006.01)
(Continued)

(52) U.S. Cl.
CPC ............. *G06F 17/15* (2013.01); *G06N 5/046* (2013.01); *G06T 5/10* (2013.01); *G06T 2207/20024* (2013.01)

(58) Field of Classification Search
CPC ............ G06F 17/15; G06N 5/046; G06T 5/10
(Continued)

(56) References Cited

U.S. PATENT DOCUMENTS

2011/0029471 A1\* 2/2011 Chakradhar .......... G06N 3/063
706/25
2018/0032857 A1 2/2018 Lele et al.
(Continued)

FOREIGN PATENT DOCUMENTS

WO 2010064728 6/2010
WO 2017003887 1/2017

OTHER PUBLICATIONS

Tianshi Chen; Zidong Du; Ninghui Sun; Jia Wang; Chengyong Wu; Yunji Chen; Olivier Temam, "DianNao: a small-footprint high-throughput accelerator for ubiquitous machine-learning" 2014.
(Continued)

*Primary Examiner* — Tan V Mai
(74) *Attorney, Agent, or Firm* — Hayes Soloway P.C.

(57) ABSTRACT

A reconfigurable convolution engine for performing a convolution operation on an image is disclosed. A data receiving module receives image data. A determination module determines a kernel size based on the image data, clock speed associated to the convolution engine and available on-chip resources. A generation module generates a plurality of instances based on the kernel size. A configuration module configures an adder engine comprising a plurality of adders configured to operate in a pipelined structure and in parallel with the plurality of instances. An execution module executes the convolution operation on each of the plurality of instances and the adder engine. A filtering module filters an output of the convolution operation by using a filter function configured to operate on a predefined threshold function.

9 Claims, 3 Drawing Sheets

(51) Int. Cl.
    *G06N 5/04*     (2006.01)
    *G06T 5/10*     (2006.01)
(58) Field of Classification Search
    USPC .......................................................... 708/420
    See application file for complete search history.

(56) References Cited

U.S. PATENT DOCUMENTS

| 2018/0082400 | A1  | 3/2018 | Lim et al. |              |
|--------------|-----|--------|------------|--------------|
| 2018/0089146 | A1  | 3/2018 | Hu et al.  |              |
| 2018/0137406 | A1* | 5/2018 | Howard     | G06N 3/082   |
| 2018/0268256 | A1* | 9/2018 | Di Febbo   | G06T 7/246   |
| 2019/0266485 | A1* | 8/2019 | Singh      | G06N 3/063   |

OTHER PUBLICATIONS

Yu-Hsin Chen ; Tushar Krishna ; Joel S. Emer ; Vivienne Sze, "Eyeriss: An Energy-Efficient Reconfigurable Accelerator for Deep Convolutional Neural Networks", 2016.

* cited by examiner

RECONFIGURABLE CONVOLUTION ACCELERATOR

PRIORITY INFORMATION

The present application claims benefit from Indian Complete Patent Application No: 201811023855 filed on 26 Jun. 2018 the entirety of which is hereby incorporated by reference.

TECHNICAL FIELD

The present subject matter described herein, in general, relates to a reconfigurable convolution engine and more particularly to performing a convolution operation on an image by using the reconfigurable convolution engine.

BACKGROUND

In recent times, Convolution Neural Network (CNN) technique is finding greater applications in computer vision. The computer vision is used to detect a scene or an object in real time from an image captured in various systems. Example of the various systems include, but not limited to, pedestrian detection, lane detection, autonomous driving, sign board detection, activity detection, and face recognition. In order to detect the object in real time, complex computations need to be performed. However, there is a limit on computation power of any system. This is because the hardware capabilities of any system cannot be extended in real time. In other words, the computation power is based on one or more available on-chip resources of the Field Programmable Gate Arrays (FPGA) and Application Specific Integrated Circuits (ASIC). Thus, the conventional systems and methodologies performs convolution operation only on the available on-chip resources thereby failing to perform convolution operation in real time.

SUMMARY

Before the present systems and methods, are described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to systems and methods for performing a convolution operation on an image using a reconfigurable convolution engine and the concepts are further described below in the detailed description. This summary is not intended to identify essential features of the claimed subject matter nor is it intended for use in determining or limiting the scope of the claimed subject matter.

In one implementation, a method for performing a convolution operation on an image using a reconfigurable convolution engine is disclosed. In order to perform the convolution operation, initially, image data may be received for performing a convolution operation on the image by using a convolution engine. Upon receiving the image data, a kernel size may be determined based on the image data, clock speed associated to the convolution engine and number of available on-chip resources. Subsequent to the determination of the kernel size, a plurality of instances may be generated based on the kernel size. In one aspect, the plurality of instances is configured to operate in parallel mode. In another aspect, each instance of the plurality of instances is configured to perform convolution operation with the clock speed of the convolution engine. Further, an adder engine may be configured based on the plurality of instances. The adder engine comprises a plurality of adders configured to operate in a pipelined structure and in parallel with the plurality of instances. Furthermore, the convolution operation may be executed on each of the plurality of instances and the adder engine. In addition, an output of the convolution operation may be filtered by using a filter function configured to operate on a predefined threshold function thereby performing the convolution operation on the image using the reconfigurable convolution engine. In another aspect, the aforementioned method for performing the convolution operation on the image using the reconfigurable convolution engine may be performed by a processor using programmed instructions stored in a memory.

In another implementation, a reconfigurable convolution engine for performing a convolution operation on an image is disclosed. The reconfigurable convolution engine may comprise a processor and a memory coupled to the processor. The processor may execute a plurality of modules present in the memory. The plurality of modules may comprise a data receiving module, a determination module, a generation module, a configuration module, an execution module and a filter module. The data receiving module may receive image data for performing a convolution operation on the image. The determination module may determine a kernel size based on the image data, clock speed associated to the convolution engine and number of available on-chip resources. The generation module may generate a plurality of instances based on the kernel size. In one aspect, the plurality of instances is configured to operate in parallel mode. In another aspect, each instance of the plurality of instances is configured to perform convolution operation with the clock speed of the convolution engine. Subsequent to generating the plurality of instances, the configuration module may configure an adder engine based on the plurality of instances. In one aspect, the adder engine comprises plurality of adders configured to operate in a pipelined structure and in parallel with the plurality of instances. Further, the execution module may execute the convolution operation on each of the plurality of instances and the adder engine. Furthermore, the filtering module may filter an output of the convolution operation by using a filter function configured to operate on a predefined threshold function thereby performing the convolution operation on the image using the reconfigurable convolution engine.

In yet another implementation, non-transitory computer readable medium embodying a program executable in a computing device for performing a convolution operation on an image using a reconfigurable convolution engine is disclosed. The program may comprise a program code for receiving image data for performing a convolution operation on an image by using a convolution engine. The program may further comprise a program code for determining a kernel size based on the image data, clock speed associated to the convolution engine and number of available on-chip resources. The program may further comprise a program code for generating a plurality of instances based on the kernel size. In one aspect, the plurality of instances is configured to operate in parallel mode. In another aspect, each instance of the plurality of instances is configured to perform convolution operation with the clock speed of the convolution engine. The program may further comprise a program code for configuring an adder engine based on the plurality of instances. In one aspect, the adder engine may comprise plurality of adders configured to operate in a pipelined structure and in parallel with the plurality of instances. The program may further comprise a program code for executing the convolution operation on each of the plurality of instances and the adder engine by using a Convolution Neural Network (CNN) technique. The program may further comprise a program code for filtering an output of the convolution operation by using a filter function configured to operate on a predefined threshold function thereby performing the convolution operation on the image using the reconfigurable convolution engine.

BRIEF DESCRIPTION OF THE DRAWINGS

The foregoing detailed description of embodiments is better understood when read in conjunction with the appended drawings. For the purpose of illustrating the disclosure, example constructions of the disclosure are shown in the present document; however, the disclosure is not limited to the specific methods and apparatus disclosed in the document and the drawings.

The detailed description is given with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
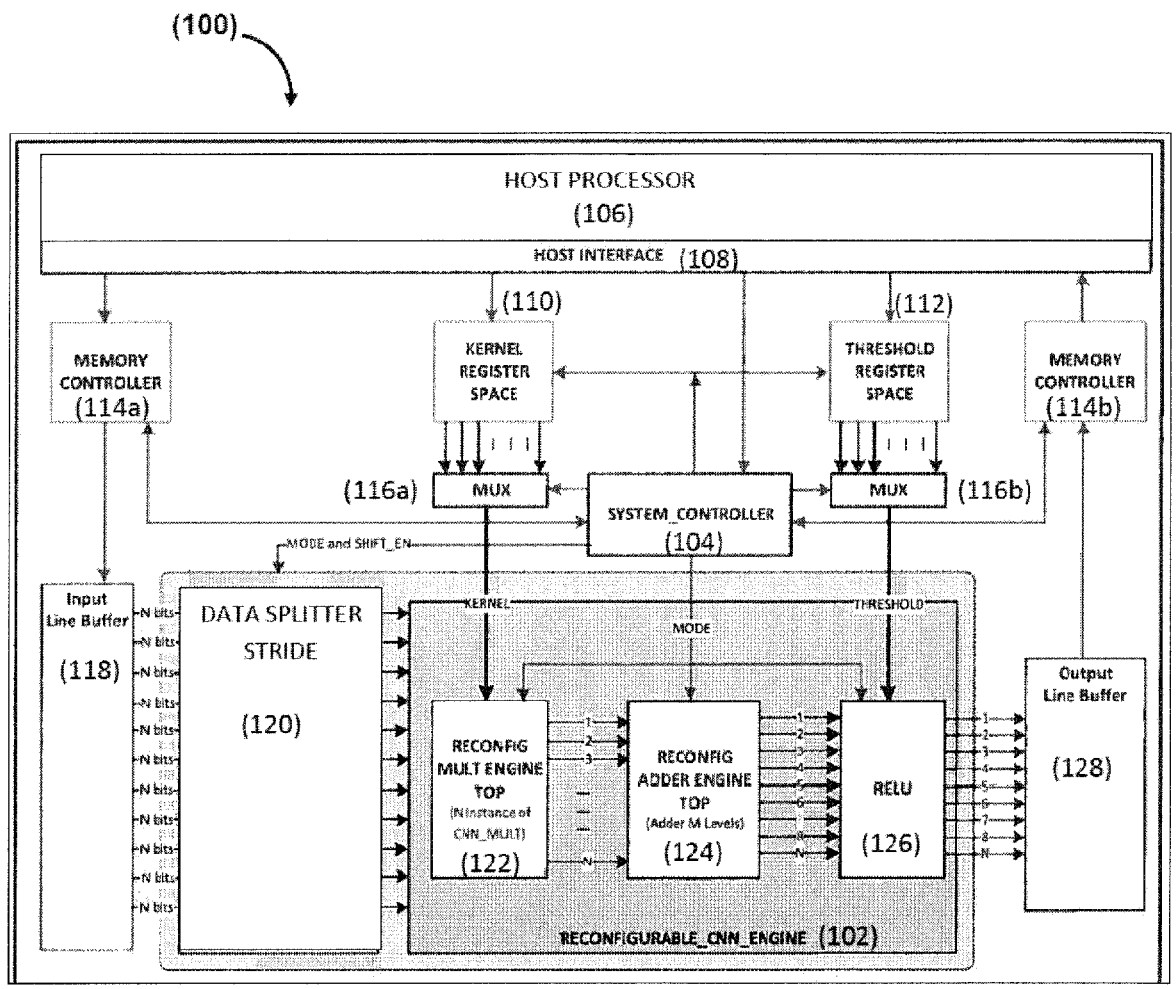
FIG. 1 illustrates a hardware implementation of a reconfigurable convolution engine for performing a convolution operation on an image, in accordance with an embodiment of the present subject matter.

Some embodiments of this disclosure, illustrating all its features, will now be discussed in detail. The words "receiving," "determining," "generating," "configuring," "executing," and "filtering," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the exemplary, systems and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

The present invention performs a convolution operation on an image using a reconfigurable convolution engine. It is to be noted that the reconfigurable convolution engine utilizes already available on-chip resources of at least Field Programmable Gate Arrays (FPGA) and Application Specific Integrated Circuits (ASIC). Example of the on-chip resources include, but not limited to, registers, Digital Signal Processing (DSP) chips, memory controllers, multipliers, multiplexers, and adders. The reconfigurable convolution engine comprises a (M×M) multiplier array followed by a pipelined adder structure and a configurable filter function. The reconfigurable convolution engine facilitates reuse of the on-chip resources by performing concurrent computations. It is to be noted that the reconfigurable convolution engine adapts various combinations of kernel sizes and strides. Various versions of kernel size include, but not limited to, 3×3, 5×5, 7×7, 9×9, and n×n.

In order to perform the convolution operation on the image, initially, image data pertaining to the image may be received from a host processor. The image data may comprise pixel resolution, number of filters to be applied, and a convolution layer. In an implementation, the convolution layer indicates a layer to be used for convolution operation of the image. In another implementation, one convolution layer may comprise different kernel size than another convolution layer. Upon receipt of the image data, kernel size for performing the convolution operation may be determined. In an implementation, kernel size may be determined based on the convolution layer. The convolution layer may be configured by the host processor. Subsequent to determining the kernel size, a plurality of instances may be generated. The plurality of instances is configured to operate in parallel mode. Each instance of the plurality of instances may be configured to perform convolution operation with the clock speed of the convolution engine. Each instance of the plurality of instances may comprise M×M blocks of multiplier.

Upon generating the plurality of instances, an adder engine comprising a plurality of adders may be configured. The plurality of adders may be configured to operate in a pipelined structure and in parallel with the plurality of instances. After configuration, the convolution operation on each of the plurality of instances and the adder engine may be executed. Subsequently, an output of the convolution operation may be filtered by using the configurable filter function thereby performing the convolution operation on the image using the reconfigurable convolution engine. While aspects of described system and method for performing the convolution operation on the image using the reconfigurable convolution engine and may be implemented in any number of different computing systems, environments, and/or configurations, the embodiments are described in the context of the following exemplary reconfigurable convolution engine.

Referring now to FIG. 1, a hardware implementation 100 of a reconfigurable convolution engine 102 for performing the convolution operation on an image is disclosed. The reconfigurable convolution engine 102 may comprise a reconfigurable multiplier engine 122, a reconfigurable adder engine 124 (hereinafter may also be referred as adder engine), and a Rectification Liner Unit (ReLU) 126. The reconfigurable convolution engine 102 may be implemented in a variety of computing systems, such as a laptop computer, a desktop computer, a notebook, a workstation, and a mainframe computer. The reconfigurable convolution engine 102 may be configured to utilize on-chip resources of at least one of Field Programmable Gate Arrays (FPGA) and Application Specific Integrated Circuits (ASIC). The on-chip resources may comprise a host processor 106, a host interface 108, memory controller 114a and 114b (collectively referred as memory controller 114), a kernel register space 110, a threshold register space 112, multiplexers 116a and 116b (collectively referred as multiplexer 116), a system controller 104, an input line buffer 118, a data splitter stride 120, and an output line buffer 128.

The host processor 106 may be a Central Processing Unit (CPU) installed in at least one of the variety of computing systems. To perform the convolution operation on the image, the image data is received from the host interface 108. The host interface 108 may be a bus interface configured to execute a protocol for data transfer between the host processor 106 and the convolution engine 102. It is to be understood that a user may interact with the reconfigurable convolution engine 102 via the host interface 108. The host interface 108 may include a variety of software and hardware interfaces, for example, a web interface, a graphical user interface, and the like. The host interface 108 may allow the reconfigurable convolution engine 102 to interact with the user directly or through other client devices. Further, the host interface 108 may enable the reconfigurable convolution engine 102 to communicate with other computing devices, such as web servers and external data servers (not shown). The host interface 108 can facilitate multiple communications within a wide variety of networks and protocol types, including wired networks, for example, LAN, cable, etc., and wireless networks, such as WLAN, cellular, or satellite. The host interface 108 may include one or more ports for connecting a number of devices to one another or to another server. In an implementation, the host interface 108 may facilitate on-chip communication by implementing on-chip bus protocols including, but not limited to, Advanced Microcontroller Bus Architecture (AMBA) Advanced High-Performance bus (AHB) and Advanced Extensible Interface (AXI), Wishbone Bus, Open Core Protocol (OCP) and Core Connect Bus. In other implementation, the host interface 108 may facilitate off-chip communication by implementing off-chip bus protocols including, but not limited to, Universal Serial Bus (USB), and High speed interface.

The kernel register space 110 may be configured to hold kernel values related to the convolution layer in operation. The threshold register space 112 may be configured hold parameters for a filter function. Example of the filter function include, but not limited to, the ReLU, Sigmoid or Logistic, and Hyperbolic tangent function-Tanh. The multiplexer 116 may be configured to pass the kernel values to the convolution engine 102 for the convolution operation. The input line buffer 118 may be configured to hold the image data for the convolution operation. The output line buffer 128 may be configured to receive the output of the convolution engine 102 and buffer the output before passing to next stage of processing.

The memory controller 114 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory controller 114 is further connected to the input line buffer 118 to fetch external image data. Based on instructions provided by the host interface 108, the data splitter stride 120 slices the image data into one or more strides based on signal received from the system controller 104.

The system controller 104 is connected to the host interface 108, the kernel register space 110, the threshold register space 112, the multiplexer 116, the memory controller 114, and the adder engine 124. The system controller 104 may be configured to generate a mode signal based on the image data received from the host interface 108. The mode signal indicates kernel size and layers of convolution to be performed on the image. The system controller 104 may also be configured to store programmed instructions to operate the reconfigurable convolution engine 102. In an implementation, the system controller 104 is configured to provide the mode signal to the data splitter stride 120, the adder engine 124, the reconfigurable multiplier engine 122, and the ReLU 126.

The data splitter stride 120 is connected to the input line buffer 118. In an example, if the reconfigurable multiplier engine 122 is of M×M size, then the data splitter stride 120 may comprise M+1 input and M+1 output lines. The M+1 input lines may be connected to M+1 input line buffer, and M+1 output lines may be connected to the reconfigurable multiplier engine 122. The data splitter stride 120 may be configured to perform two functions. First, the data splitter stride 120 is configured to pack the image data received from the input line buffer 118 for the reconfigurable multiplier engine 122. The image data may be packed based on the mode signals. Second, the data splitter stride 120 may skip the image data from the input line buffer 118 based on the stride selected by the host processor 106. The image data may be skipped based on a shift signal transmitted by the system controller 104.

The reconfigurable multiplier engine 122 may comprise a plurality of multipliers. Each multiplier is referred as an instance. It is to be noted that each multiplier is represented as a unique identification number, for example, MULT_ID. In one implementation, size of the reconfigurable multiplier engine 122 is configured dynamically based on the kernel size. The kernel size is configured by the mode signal. Upon receipt of the mode signal, the reconfigurable multiplier engine 122 may be segmented into the plurality of the instances of size M×M. Each instance of the plurality of instances may comprise a connection table, a data slicer, and a multiplier function. The connection table is configured to route the input line buffer 118 data to the data slicer. It is important to note that the connection table is configured to route the data based on the mode signal and the MULT_ID associated to each of the instance. The data slicer is configured to slice off the image data into pixel data and kernel based on the mode signal and the MULT_ID. It is to be noted that the MULT_ID may optimize functionality of the data slicer during compile time and the mode signal may assist the data slicer in run time. The multiplier function may represent a mathematic functional block configured to multiply image data with the kernel. The output of the mathematic functional block is concatenated with the MULT_ID and reserved bits for debugging and further expansion of the multiplier function. In one aspect, when the reconfigurable convolution engine 102 is implemented on the FPGA, the multiplier functional may be implemented on the on-chip DSP. In another aspect, when the reconfigurable convolution engine 102 is implemented on the ASIC, the multiplier functional block may be used as a separate functional block.

The adder engine 124 is configured to perform adder operation on the outputs of the plurality of instances running in parallel. The adder engine comprises a plurality of adders arranged in a pipelined structure. Each adder from the plurality of adders may comprise a connection table and an adder logic. In an example, for the reconfigurable multiplier engine 122 comprising N instances, total number of adders to be required is N−1 for performing concurrent convolution operations.

The ReLU 126 may be configured to filter the output of the adder engine 124 based on a threshold set by the host processor 108. In an implementation, the ReLU 126 may comprise a bypass function to transmit the output of the adder engine 124 without filtering.

Figure 2:
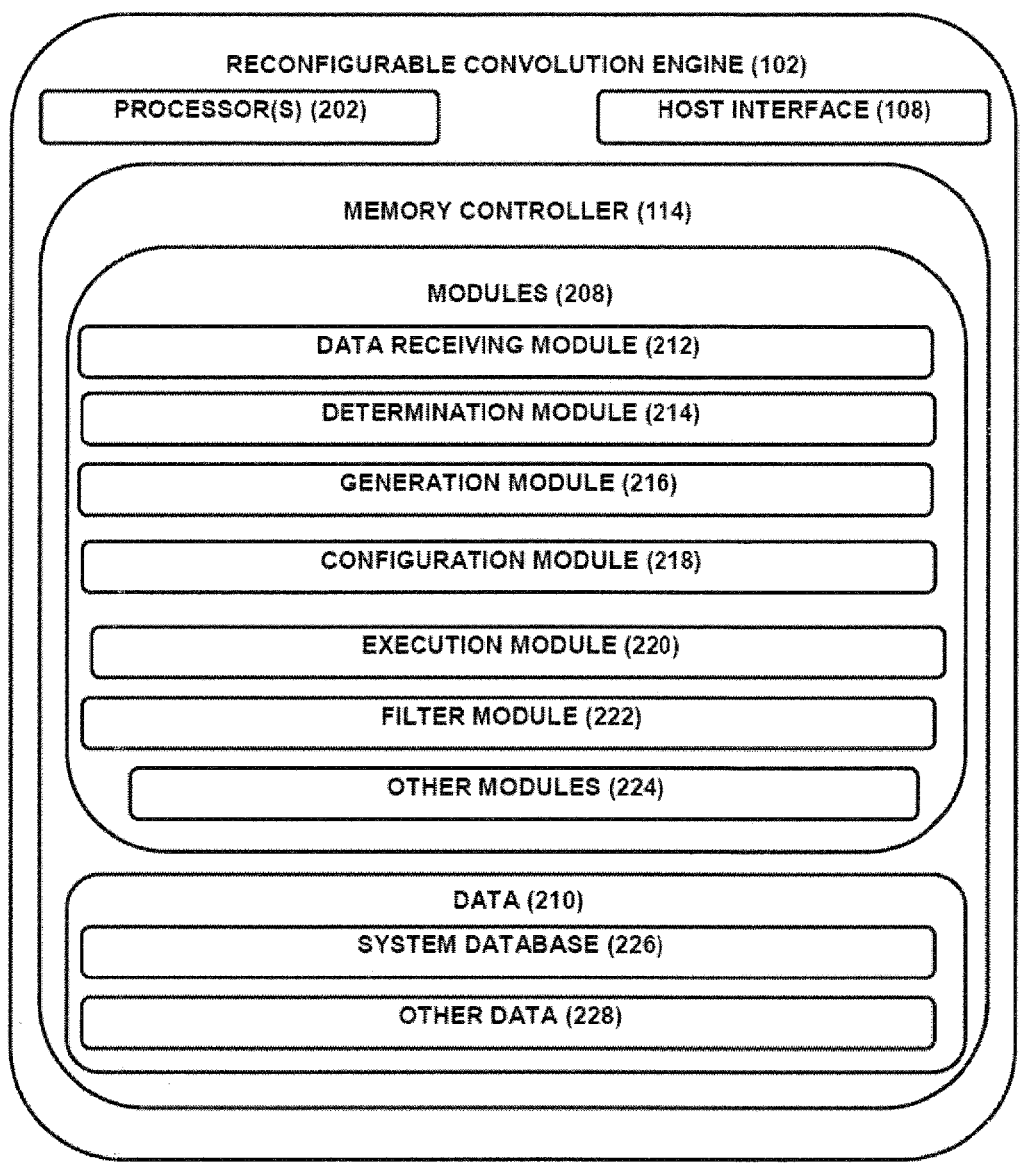
FIG. 2 illustrates the reconfigurable convolution engine, in accordance with an embodiment of the present subject matter.

Referring now to FIG. 2, the reconfigurable convolution engine 102 is illustrated in accordance with an embodiment of the present subject matter. In one embodiment, the reconfigurable convolution engine 102 may include at least one processor 202, a host interface 108, and a memory controller 114. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory controller 114. The memory controller 114 may include modules 208 and data 210.

The modules 208 include routines, programs, objects, components, data structures, etc., which perform particular tasks or implement particular abstract data types. In one implementation, the modules 208 may include a data receiving module 212, a determination module 214, a generation module 216, a configuration module 218, an execution module 220, a filter module 222, and other modules 224. The other modules 224 may include programs or coded instructions that supplement applications and functions of the reconfigurable convolution engine 102. The modules 208 described herein may be implemented as software modules that may be executed in the cloud-based computing environment of the reconfigurable convolution engine 102.

The data 210, amongst other things, serves as a repository for storing data processed, received, and generated by one or more of the modules 208. The data 210 may also include a system database 226 and other data 228. The other data 228 may include data generated as a result of the execution of one or more modules in the other modules 224.

As there are various challenges observed in the existing art, the challenges necessitate the need to build the reconfigurable convolution engine 102 for performing a convolution operation on an image. In order to perform the convolution operation on the image, at first, a user may use the host device to access the reconfigurable convolution engine 102 via the host interface 108. The user may register them using the host interface 108 in order to use the reconfigurable convolution engine 102. In one aspect, the user may access the host interface 108 of the reconfigurable convolution engine 102. The reconfigurable convolution engine 102 may employ the data receiving module 212, the determination module 214, the generation module 216, the configuration module 218, the execution module 220, and the filter module 222. The detail functioning of the modules is described below with the help of figures.

The present subject matter describes the reconfigurable convolution engine 102 for performing a convolution operation on an image. To do so, initially, the data receiving module 212 receives image data pertaining to the image. The image data comprises pixel resolution, number of filters to be applied, and a convolution layer. In one implementation, a filter from the number of filters may be considered as a kernel for performing the convolution operation. The kernel may also be referred as a feature detector. Upon receiving the image data, the determination module 214 determines a kernel size based on the image data, clock speed associated to the convolution engine and number of available on-chip resources. It is to be noted that the clock speed of the convolution engine is same as the clock speed of a Graphical Processing Unit (GPU) installed in at least one of the variety of computing systems. In an implementation, the kernel size may also be determined based on the mode signal received from the host processor 108. In an implementation, the kernel size may be determined based on the convolution layer received from the host interface 108.

Subsequent to determining the kernel size, the generation module 216 generates a plurality of instances based on the kernel size. In one aspect, the plurality of instances is configured to operate in parallel mode. In another aspect, each instance of the plurality of instances is configured to perform convolution operation with the clock speed of the convolution engine. Each instance comprises a connection table, a data slicer, and a multiplier. It is to be noted that each multiplier comprises a multiplier function. In an implementation, the multiplier function may multiply the pixel resolution with the kernel. In another implementation, the generation module 216 may generate the plurality of the instances of size M×M based on the mode signal. In an example, when the kernel size is 3×3 and size of the reconfigurable multiplier engine 122 is 10×10, 9 parallel instances of size 3×3 are created. In an alternative example, when the kernel size is 5×5 and size of the reconfigurable multiplier engine 122 is 10×10, 4 parallel instances of size 5×5 are created. In yet another example, when the kernel size is 7×7 and size of the reconfigurable multiplier engine 122 is 10×10, 1 parallel instance of size 7×7 is created. In yet another example, when the kernel size is 9×9 and size of the reconfigurable multiplier engine 122 is 10×10, 1 parallel instance of size 9×9 is created.

After generating the plurality of instances, the configuration module 218 configures an adder engine based on the plurality of instances. In one aspect, the adder engine comprises a plurality of adders configured to operate in a pipelined structure and in parallel with the plurality of instances. Each adder from the plurality of adders comprises a connection table and an adder logic. In an implementation, when the plurality of the instances is of the size M×M, the configuration module 218 may configure M−1 adders.

Upon configuration of the plurality of the adders, the execution module 220 executes the convolution operation on each of the plurality of instances and the plurality of adders. The execution module 220 executes the convolution operation in a concurrent environment based on the mode signal. In an implementation, the mode signal represents number of layers required by the adder engine to execute the convolution operation concurrently.

Once the convolution operation is executed, the filter module 222 filters an output of the convolution operation by using a filter function. Example of the filter function include, but not limited to, a Rectified Linear Unit (ReLU), Sigmoid or Logistic, and Hyperbolic tangent function-Tanh. In one implementation, the ReLU 126 may be configured to operate on a predefined threshold function provided by the host interface 108 thereby performing the convolution operation on the image using the reconfigurable convolution engine 102. In one implementation, the convolution engine 102 may be utilized to perform convolution operation for at least one of Convolution Neural Network (CNN) technique, Deep Recurrent Neural Network (Deep RNN) technique, and Artificial Neural Network (ANN) technique.

In order to elucidate further, consider an example where image size=640×400; stride=1; kernel size=3×3; and number of input filter=1. Assuming the clock speed of the reconfigurable convolution engine 102 as 100 MHz i.e. 10 ns and size of the multiplier engine as 10×10.

Number of convolutions for the image of size $640 \times 400 = 256 \times 10^6$ convolutions Time taken for one convolution using one engine=10 ns=$10^{-8}$ seconds Time taken for $256 \times 10^6$ convolutions=$256 \times 10^{6} * 10^{-8} = 2.56 \times 10^{-3}$ seconds As the kernel size is 3×3, 9 instances of the multiplier engine can be operated concurrently, thus the effective convolution time would be =$2.56 \times 10^{-3}/9 = 284.44 \times 10^{-6}$ seconds Thus, by increasing the kernel size, effective time for execution of the convolution operation may be reduced.

Figure 3:
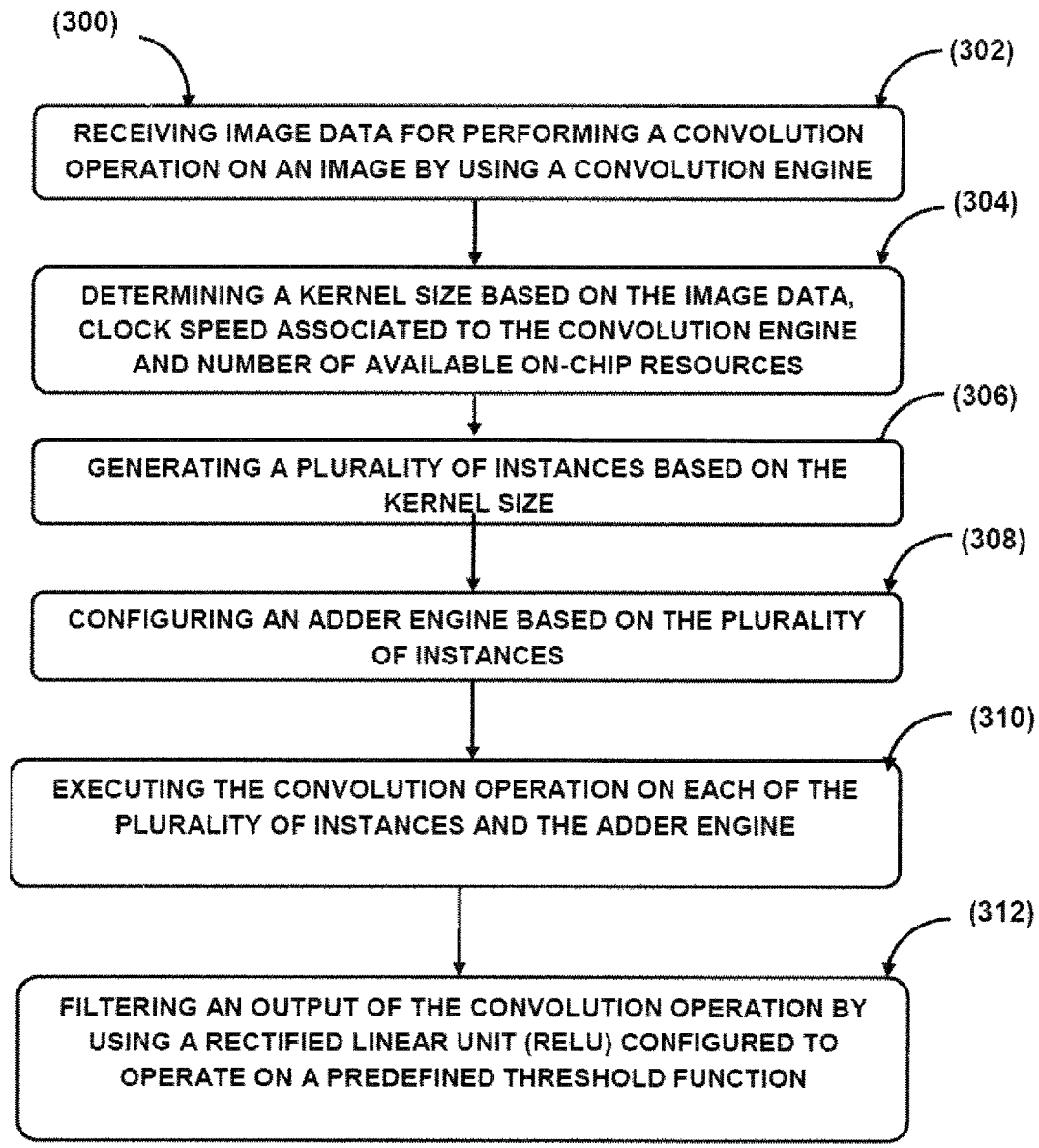
FIG. 3 illustrates a method for performing a convolution operation on an image by using a reconfigurable convolution engine, in accordance with an embodiment of the present subject matter.

Referring now to FIG. 3, a method 300 for performing a convolution operation on an image using a reconfigurable convolution engine is shown, in accordance with an embodiment of the present subject matter. The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method can be implemented in any suitable hardware, software, firmware, or combination thereof. However, for ease of explanation, in the embodiments described below, the method 300 may be considered to be implemented as described in the reconfigurable convolution engine 102.

At block 302, image data may be received for performing a convolution operation on an image by using a convolution engine. In one implementation, the image data, for performing a convolution operation on an image by using a convolution engine, may be received by a data receiving module 212.

At block 304, a kernel size may be determined based on the image data, clock speed associated to the convolution engine and number of available on-chip resources. In one implementation, the kernel size may be determined by a determination module 214.

At block 306, a plurality of instances may be generated based on the kernel size. In one aspect, the plurality of instances is configured to operate in parallel mode. In another aspect, each instance of the plurality of instances is configured to perform convolution operation with the clock speed of the convolution engine. In one implementation, the plurality of instances may be generated based on the kernel size by a generation module 216.

At block 308, an adder engine may be configured based on the plurality of instances. In one aspect, the adder engine may comprise plurality of adders configured to operate in a pipelined structure and in parallel with the plurality of instances. In one implementation, the adder engine may be configured by a configuration module 218.

At block 310, the convolution operation on each of the plurality of instances and the adder engine may be executed. In one implementation, the convolution operation on each of the plurality of instances and the adder engine by may be executed by an execution module 220.

At block 312, an output of the convolution operation may be filtered by using a filter function configured to operate on a predefined threshold function thereby performing the convolution operation on the image using the reconfigurable convolution engine. In one implementation, output of the convolution operation may be filtered by a filtering module 222.

Exemplary embodiments discussed above may provide certain advantages. Though not required to practice aspects of the disclosure, these advantages may include those provided by the following features.

Some embodiments enable a system and a method to perform convolution operations in concurrent.

Some embodiments enable a system and a method to enhance processing power of the available on chip resources by concurrently performing convolution operations.

Some embodiments enable a system and a method to reuse same resource for one or more convolution layer.

Some embodiments enable a system and a method to reconfigure the convolution engine based on various kernel sizes.

Some embodiments enable a system and a method to increase throughput of the reconfigurable convolution engine by increasing an operating frequency of the reconfigurable convolution engine.

Although implementations for methods and systems for performing a convolution operation on an image using a reconfigurable convolution engine have been described in language specific to structural features and/or methods, it is to be understood that the appended claims are not necessarily limited to the specific features or methods described. Rather, the specific features and methods are disclosed as examples of implementations for performing a convolution operation on an image using a reconfigurable convolution engine.

The invention claimed is:

1. A method for performing a convolution operation on an image using a reconfigurable convolution engine, the method comprising:

receiving, by a processor, image data for performing a convolution operation on an image by using a convolution engine;

determining, by the processor, a kernel size based on the image data, a clock speed associated with the convolution engine, and a number of available on-chip resources;

generating, by the processor, a plurality of instances based on the kernel size, wherein the plurality of instances is configured to operate in parallel mode, and wherein each instance of the plurality of instances is configured to perform convolution operation with the clock speed of the convolution engine;

configuring, by the processor, an adder engine based on the plurality of instances, wherein the adder engine comprises a plurality of adders configured to operate in a pipelined structure and in parallel with the plurality of instances;

executing, by the processor, the convolution operation on each of the plurality of instances and the adder engine; and filtering, by the processor, an output of the convolution operation by using a filter function configured to operate on a predefined threshold function thereby performing the convolution operation on the image using the reconfigurable convolution engine.

2. The method of claim 1, wherein each instance comprises a connection table, a data slicer, and a multiplier.

3. The method of claim 1, wherein each adder from the plurality of adders comprises a connection table and an adder logic.

4. The method of claim 1, wherein the image data comprises pixel resolution, number of filters to be applied, and a convolution layer.

5. A reconfigurable convolution engine for performing a convolution operation on an image, the reconfigurable convolution engine comprising:
   a processor; and
   a memory coupled to the processor, wherein the processor is capable of executing a plurality of modules stored in the memory, and wherein the plurality of modules comprising:
      a data receiving module for receiving image data for performing a convolution operation on an image by using a convolution engine;
      a determination module for determining a kernel size based on the image data, a clock speed associated with the convolution engine, and a number of available on-chip resources;
      a generation module for generating a plurality of instances based on the kernel size, wherein the plurality of instances is configured to operate in parallel mode, and wherein each instance of the plurality of instances is configured to perform convolution operation with the clock speed of the convolution engine;
      a configuration module for configuring an adder engine based on the plurality of instances, wherein the adder engine comprises a plurality of adders configured to operate in a pipelined structure and in parallel with the plurality of instances;
      an execution module for executing the convolution operation on each of the plurality of instances and the adder engine; and
      a filter module for filtering an output of the convolution operation by using a filter function configured to operate on a predefined threshold function thereby performing the convolution operation on the image using the reconfigurable convolution engine.

6. The reconfigurable convolution engine of claim 5, wherein each instance comprises a connection table, a data slicer, and a multiplier.

7. The reconfigurable convolution engine of claim 5, wherein each adder from the plurality of adders comprises a connection table and an adder logic.

8. The reconfigurable convolution engine of claim 5, wherein the image data comprises pixel resolution and number of filters to be applied.

9. A non-transitory computer readable medium embodying a program executable in a computing device for performing a convolution operation on an image using a reconfigurable convolution engine, the program comprising a program code:
   a program code for receiving image data for performing a convolution operation on an image by using a convolution engine;
   a program code for determining a kernel size based on the image data, a clock speed associated with the convolution engine, and a number of available on-chip resources;
   a program code for generating a plurality of instances based on the kernel size, wherein the plurality of instances is configured to operate in parallel mode, and wherein each instance of the plurality of instances is configured to perform convolution operation with the clock speed of the convolution engine;
   a program code for configuring an adder engine based on the plurality of instances, wherein the adder engine comprises a plurality of adders configured to operate in a pipelined structure and in parallel with the plurality of instances;
   a program code for executing the convolution operation on each of the plurality of instances and the adder engine; and
   a program code for filtering an output of the convolution operation by using a filter function configured to operate on a predefined threshold function thereby performing the convolution operation on the image using the reconfigurable convolution engine.

* * * * *